United States Patent [19]

Hore

[11] 4,357,568
[45] Nov. 2, 1982

[54] VARIABLE SPEED AC DYNAMO ELECTRIC MACHINE

[76] Inventor: Donald L. Hore, 10 Charnhill Vale, Mangotsfield, Bristol BS17 3JT, England

[21] Appl. No.: 609,790

[22] Filed: Sep. 2, 1975

[30] Foreign Application Priority Data

Sep. 5, 1974 [GB] United Kingdom ............... 38859/74

[51] Int. Cl.³ ............................................ H02K 37/00
[52] U.S. Cl. ................................. 318/695; 310/49 R; 310/12; 318/135
[58] Field of Search ............... 318/198, 213, 219, 216, 318/722, 242, 293, 134, 135, 695, 173, 211, 121, 122, 123, 124, 125, 127, 128; 310/49, 46, 174, 30, 28, 15

[56] References Cited

U.S. PATENT DOCUMENTS

| | | | |
|---|---|---|---|
| 1,653,946 | 12/1927 | Clausen | 310/49 X |
| 1,912,167 | 5/1933 | Anderson | 318/123 X |
| 2,173,282 | 9/1939 | List | 310/46 X |
| 2,301,425 | 11/1942 | List | 310/46 |
| 2,595,870 | 5/1952 | Morganson | 310/46 |
| 3,535,604 | 10/1970 | Madsen et al. | 310/49 X |
| 3,539,847 | 11/1970 | Gifford | 310/49 |

Primary Examiner—Donovan F. Duggan
Attorney, Agent, or Firm—Robert D. Yeager

[57] ABSTRACT

A single phase or multiphase dynamo electric machine including a stator member having at least one winding arranged to be energized to provide an alternating flux, and a further member, e.g. a rotor, movable with respect to the stator and having at least one short circuited winding providing at each position of the movable member alternative paths of low and high reluctance to the passage of alternating magnetic flux, sensing means for sensing the relative position of the two members, switching means actuated by the sensing means to cause the movable member to lock in position relative to the stator at a null position and to effect successive energization of the stator winding at other than the null position to effect continuous movement of the movable member past the stator.

8 Claims, 10 Drawing Figures

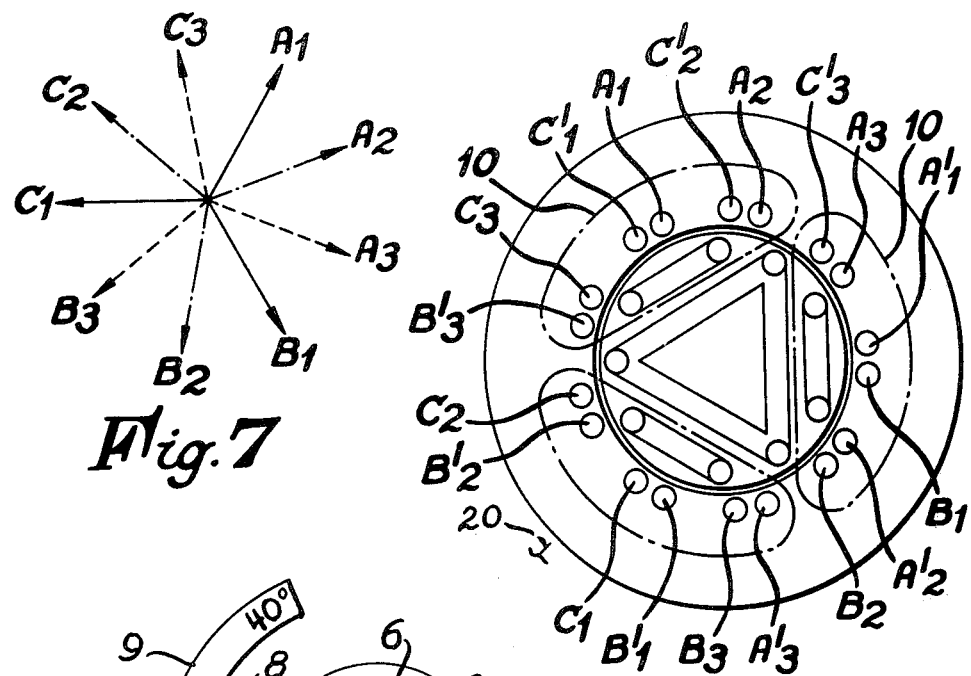
Fig.7
Fig.6
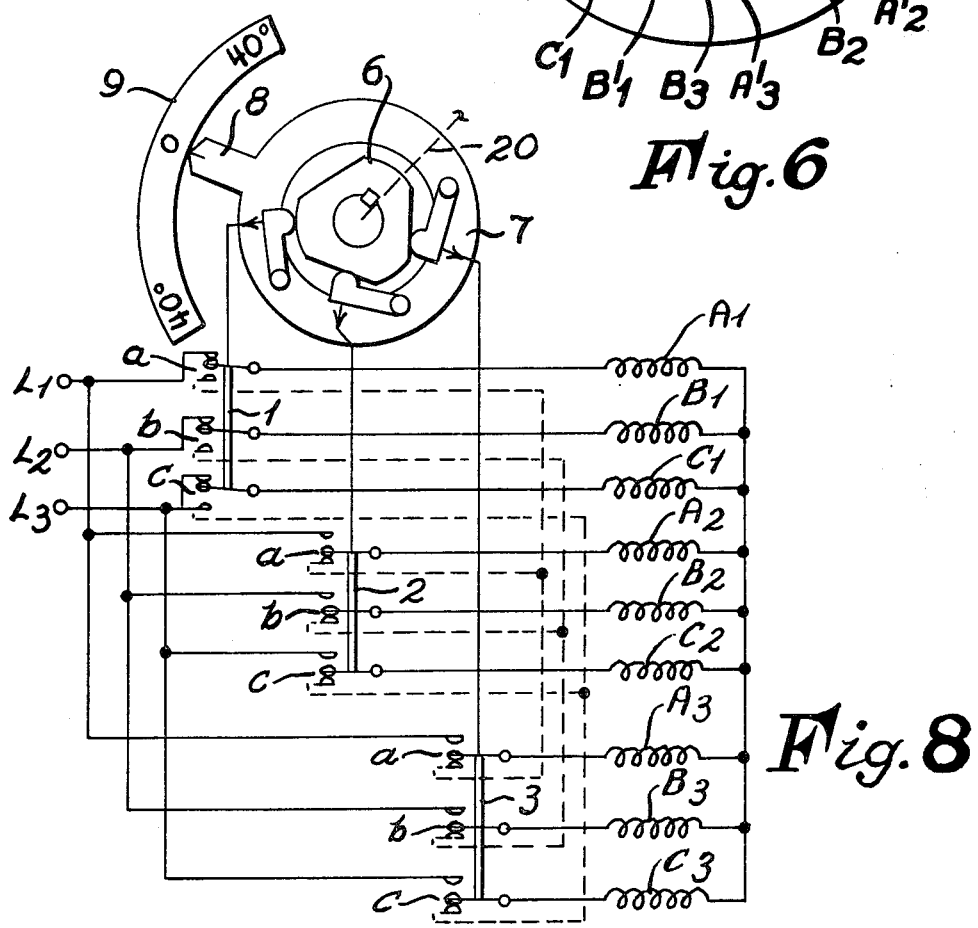
Fig.8

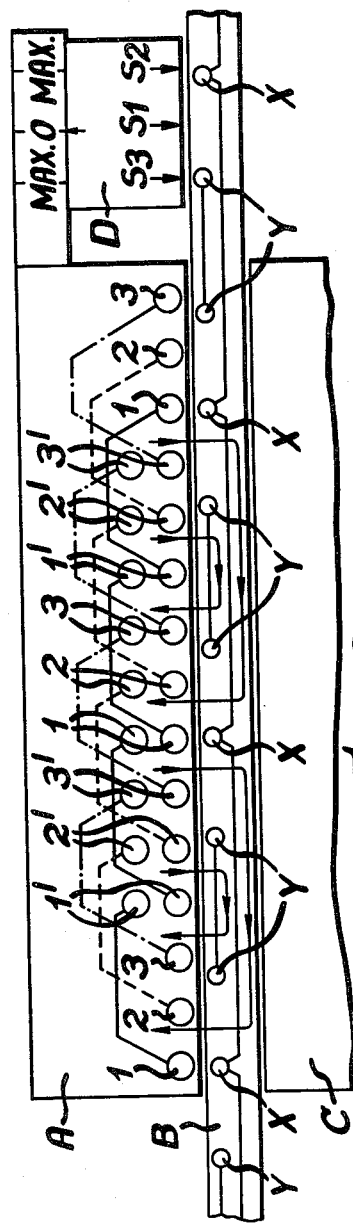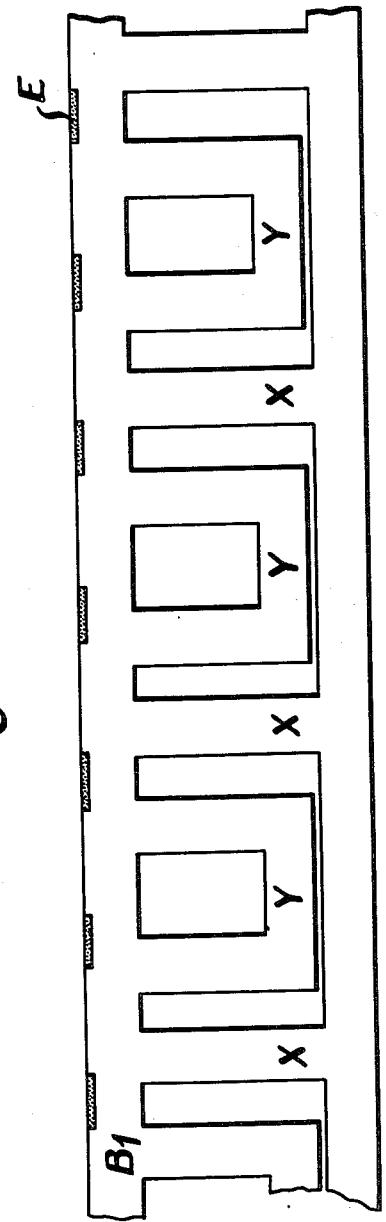

VARIABLE SPEED AC DYNAMO ELECTRIC MACHINE

BACKGROUND OF THE INVENTION

This invention relates to dynamo electric machines and in particular to a modification of the modified squirrel cage motor forming the subject of my co-pending U.S.A. Patent Application Ser. No. 573,602.

In G.B. Patent Application No. 17412/73 I have described a single or multiphase dynamo electric machine including a stator having at least one winding wound thereon, and a rotor having short circuited windings so disposed as to provide alternative low and high reluctance paths to the passage of alternating magnetic flux whereby the reactance of the stator windings or the distribution of flux between the windings may be varied.

SUMMARY OF THE INVENTION

The machine of the present invention is of generally similar design and appearance to a conventional squirrel cage motor, except that the rotor windings are designed as described for the cage regulator described in said G.B. Patent Application No. 17412/73, to form longitudinal short-circuit loops to limit the passage of alternating flux to selected, restricted paths through the rotor. Additionally, contacts or equivalent solid state devices are actuated sequentially in response to the rotation of the rotor, by means such as a cam, to effect energisation and de-energisation of the stator windings in a sequential seriatim manner.

Thus, according to one aspect of the present invention there is provided a single phase or multi-phase dynamo electric machine comprising a stationary member having a plurality of windings wound thereon, a movable member provided with a plurality of short circuited windings, and switching means for effecting energisation of the windings on the stationary member in a predetermined sequence to change the flux linkage of the short circuited windings to effect movement of the movable member relative to the stationary member and in a direction determined by the sequence of energisation of the stationary windings.

In one embodiment of the invention, the stationary member and the movable member are the stator and rotor respectively of a cage motor, the switching means constituting a stator commutator such that selective actuation of switching contacts effects sequential energisation of the stator windings to vary the flux linking the short circuited rotor windings to cause rotation of the rotor in a direction determined by the order of actuation of the switching contacts.

In a linear motor equivalent of the rotary arrangement described above, a stationary linear member is provided with a plurality of sets of windings and is located closely adjacent a linear movable member provided with a plurality of short circuited windings, the switching means varying the flux linking the short circuited windings to cause movement of the movable member in one direction or the other according to the sequential order of energisation of the stationary windings.

In a further embodiment of the invention for a multi phase dynamo electric machine, the switching means are arranged that the windings of each phase not energised, are connected in opposition to increase the self aligning torque of the rotor.

BRIEF DESCRIPTION OF THE DRAWING

The invention will now be described by way of example only with particular reference to the accompanying drawings wherein:

FIG. 6 is a diagrammatic view of a 3-phase 2 pole dynamo electric machine;

FIG. 7 is a flux diagram for the machine of FIG. 6;

FIG. 8 is a circuit diagram illustrating a method of connecting non-energised stator windings in opposition;

FIG. 9 is a single phase linear motor equivalent of the arrangement of FIG. 1;

FIG. 10 is a modified version of the linear motor of FIG. 9.

DESCRIPTION OF THE PREFERRED EMBODIMENT

Figure 1:
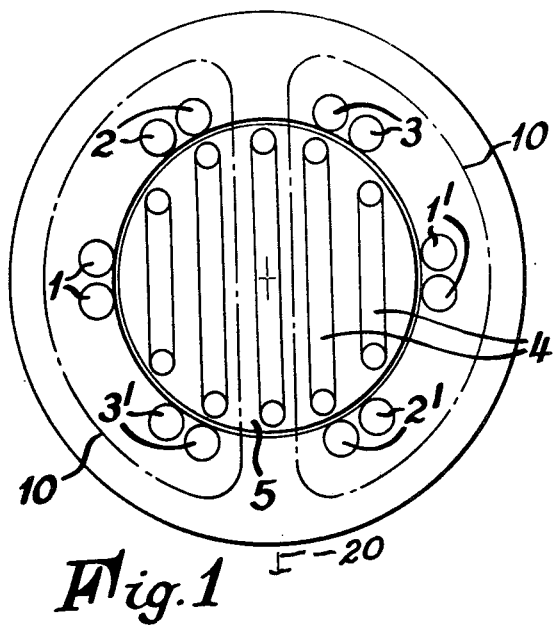
FIG. 1 is a diagrammatic view of a single-phase 2-pole cage motor.

Referring to FIG. 1, in the single-phase 2-pole construction illustrated, stator windings 1, 2, 3, are distributed as for a 3-phase 2-pole motor, except that the 'starts' are 60° apart and not 120° as with conventional squirrel cage motors. The rotor construction is identical with that shown and described in G.B. Patent Application No. 17412/73, the short-circuited windings being shown at 4. With the rotor 5 in the position shown in FIG. 1, the energising stator winding 1 produces flux paths as shown by the dotted lines, but this flux does not link the rotor windings 4. The rotor 5 will thus lock in this position since any attempt to effect rotation of the rotor will cause linking of the rotor windings 4 to produce a self-aligning torque which increases with angular displacement.

Figure 2:
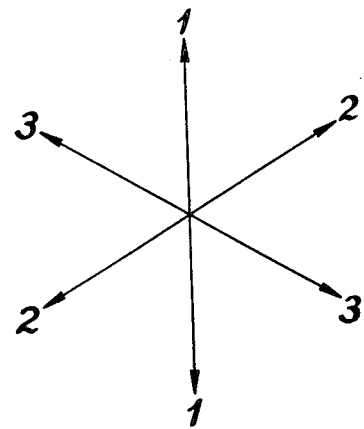
FIG. 2 is a diagram indicating the directions of flux resulting from energisation of the stator windings of the motor of FIG. 1.

If instead of energising stator winding 1, stator winding 2 or 3 is energised, the rotor will rotate in the appropiate direction to reduce the flux linkage with the short-circuited winding 4 of the rotor 5, i.e. the rotor will rotate to re-align itself with the winding energised. Thus, successive energisation of stator windings 1, 2, 3, will cause clockwise rotation of the rotor 5 while successive energisation of windings 1, 3, 2 will cause anti clockwise rotation of the rotor. The directions of flux resulting from energisation of the stator windings 1, 2, 3, are illustrated in FIG. 2.

Figure 3:
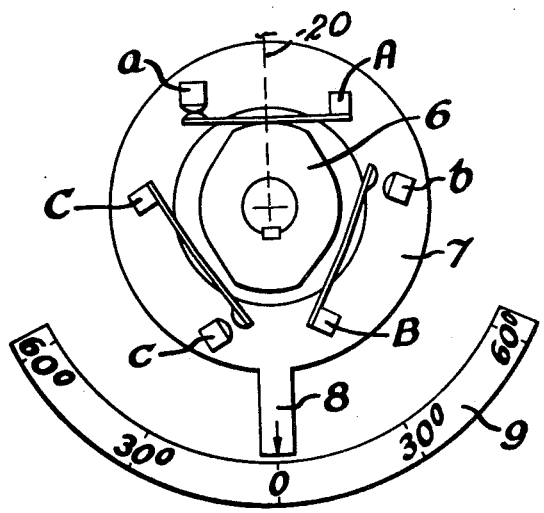
FIG. 3 is a schematic view of cam means for effecting sequential energisation of the stator windings of the motor of FIG. 1.

The angular position of the rotor relative to the stator is sensed by suitable means for effecting sequential switching of the stator windings. FIG. 3 illustrates one method of achieving this with a cam 6 on the rotor shaft 20 and cam operated contacts aA; bB; cC. Equivalent results can be achieved by using brush commutator techniques or by providing solid state equivalents of the cam and cam-operated contacts. Whichever means is used, the objective is to disconnect one stator winding and reconnect another to the supply for each 60 electrical degrees of movement of the rotor 5, the timing and order of switching being affected by movement of a position sensing means relative to the stator.

Figure 4:
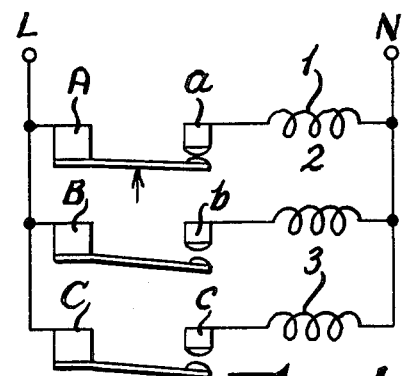
FIG. 4 is a circuit diagram of the contacts actuated by the cam means of FIG. 3.

In FIG. 3, the cam 6 is keyed to the shaft 20 of rotor 5 and has two lobes which will cause contacts Aa, Bb, Cc to close and open twice for each revolution. The contacts are mounted on a support ring 7, the angular position of which, relative to the stator, can be adjusted by actuator 8 movable over a reference scale 9. With support ring 7 and cam 6 in the position shown, contact Aa is closed, thus allowing stator winding 1 to be energised, as shown in FIG. 4, the wiring connections to FIG. 3 being omitted for clarity. With stator winding 1 energised, the null position of the rotor is as shown in FIG. 1, the chain dotted lines 10 indicating a typical flux path through the rotor and stator, which does not link with any of the short circuited rotor windings. With an a.c. supply connected, the rotor will lock in this position.

If, however, actuator 8 is moved clockwise, contact Aa will break and contact Bb will make. This will energise stator winding 2, which will cause the flux axis to move 60° clockwise, and the rotor 5 will follow this movement. In doing so, further rotation of cam 6 will break contact Bb and make contact Cc, and so on. The result will be continuous clockwise rotation at a speed or torque dependent on the relative angular displacement of the ring 7 to the stator up to a maximum of 60°.

If actuator 8 is returned to the zero position, the rotor will again lock; moving it anticlockwise will cause continuous rotation in the reverse direction.

The machine will therefore function as a single phase variable speed motor, with the advantage of no electrical connection to the rotor, and a simple and readily accessible external commutating means.

Figure 5:
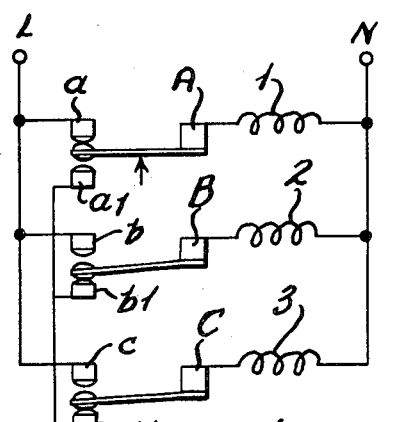
FIG. 5 is a circuit diagram of changeover contacts actuated by the cam means of FIG. 3.

Co-pending U.S.A. Patent Application Ser. No. 573,602 makes reference to the fact that the torque tending to restore the rotor to the null position can be increased as this position is approached if the windings not energised are so connected that a circulating current will flow in them. Advantage can be taken of this in the present invention. FIG. 5 shows typically how, if the switching means operated by their position sensing mechanism has change-over contacts, the windings not energised can be connected together in opposition. Equivalent systems can be devised using brush commutators or solid state position sensing and switching devices.

FIG. 6 illustrates schematically a 3 phase 2 pole machine of this type equipped with 3 sets of windings per phase displaced 40 electrical degrees from each other, as described in said U.S.A. Patent Application Ser. No. 573,602. The flux directions corresponding to energisation of these windings are illustrated in FIG. 7.

As shown in FIG. 8, the machine is again provided with position sensing and switching means, in this case to cause a switching change every 40 electrical degrees. This time the cam 6, which is connected to rotor shaft 20 has three lobes, and three cam followers each of which is arranged to simultaneously switch three windings for each 40° movement of the rotor. Again, the cam followers are attached to support ring 7 which can be rotated relative to the stator by actuator 8. With these components in the position shown, contacts 1a, 1b and 1c connect 3 phase supply lines L1, L2 and L3 to winding A1, B1 and C1 respectively. With these energised, the flux path through the stator and rotor indicated by broken lines 10 will cause the rotor to lock in the position shown; again, movement of actuator 8 relative to the stator in either direction will cause the machine to start and run continuously in either direction at a speed or torque varying with the displacement and load.

If the switching means are again arranged with a change over contact function, the two windings of each phase not energised can be connected in opposition as the null position is approached, to maximise the self aligning torque. This connection is shown by dotted lines in the circuit of FIG. 8.

While in both cases 2 pole machines are shown, multipole machines can be constructed using the same principle.

The single phase motor principle can be applied equally to a linear machine as well as a rotary machine. FIG. 9 shows one such possible arrangement. 'A' is a stator carrying three sets of windings 1, 2 and 3 arranged to form 4 poles. 'B' is the movable member or "rotor", constrained so that relative movement between B and A is parallel. The rotor is a block of magnetic material in which are embedded conductors approximately parallel to the slots carrying the stator windings, connected together at their ends to form conducting loops X and Y. With B in the position shown and winding 1 energised with single phase a.c., it is clear from the arrowed lines that flux can pass through the rotor between adjacent stator poles without linking the conducting loops. This therefore represents the null position of B in which it will tend to lock. If windings 1 were deenergised and windings 2 energised, it is clear that B will tend to move to the right to minimise the flux linkage with X and Y. This switching can be arranged automatically by suitable switching or contactless means of sensing the position of B relative to A. If the position of the sensing means is made movable relative to A, the speed or force can be increased or decreased according to the displacement of the sensing means from the zero position.

A linear motor of this type can be made double sided by the addition of C which represents a block of magnetic material, which may also carry stator windings similar to A. In such a case, it may be expedient to eliminate the iron from B, which will then comprise conducting loops only, which may be conveniently pressed out of a flat sheet of aluminium or copper. Such a construction is illustrated in FIG. 10.

An example of a position sensing means is also indicated in FIGS. 9 and 10. 'D' represents a sensing unit with three sensors S1, S2 and S3 which will cause switching of windings 1, 2 and 3 respectively. Such sensors may be of the photoelectric type, for example, which will detect a mark or a space on B or B1. Such marks are indicated at E in FIG. 10. With stator A, sensor D and "rotor" B1 in the relative positions shown, the mark below sensor S1 will cause winding 1 to be energised, thus locking B1 in position. If sensor D is moved to the left winding 1 will be de-energised and winding 2 energised, causing B1 to move to the right. This will de-energise winding 2 and the next mark will activate S3 to energise winding 3, so that continuous motion will result.

I claim:

1. A single or multi-phase dynamo electric machine comprising:
   a stator having at least one winding wound thereon, arranged to be energized from an alternating current source to provide changing magnetic flux;
   a movable member movable with respect to said stator comprising at least one short circuited winding providing at each position of said movable member alternative paths of low and high reluctance to the passage of the changing magnetic flux, to cause said movable member to adopt a position in which linkage of said at least one short circuited winding of said movable member with the energized stator winding is minimized;

means for sensing the relative position of said stator and said movable member; and, switching means arranged to be actuated by said sensing means and which, with said sensing means at a null position, causes said movable member to lock in position relative to said stator and which, with said sensing means displaced from the null position, causes self-sustained successive energization of said stator windings and consequent continuous movement of said movable member past said stator.

2. A dynamo electric machine as claimed in claim 1 wherein:
said movable member is a rotor;
said sensing means comprises a cam member mounted on the shaft of said rotor;
said switching means comprises a plurality of contact members mounted on a support member; and,
means for adjusting the angular position of said support member in relation to said stator of the machine.

3. A dynamo electric machine as claimed in claim 2 wherein:
said switching means comprises means for connecting the non-energized stator windings of each phase in opposition as the null position is approached to increase the self-aligning torque of said rotor.

4. A dynamo electric machine as claimed in claim 1 wherein:
said movable member is arranged to move past the stator in a linear manner.

5. A dynamo electric machine as claimed in claim 1 wherein:
said switching means comprises means for connecting the non-energized stator windings of each phase in opposition as a null position is approached to increase the self-aligning torque of the rotor.

6. A dynamo electric machine operable from an alternating current source comprising:
a stator having at least one winding energizable from the alternating current source to provide alternating flux which varies in magnitude;
a ferromagnetic rotor, movable with respect to the stator, having at least one short circuited winding providing alternative paths of low and high reluctance to the passage of the alternating magnetic flux;
sensing means for sensing the position of said rotor with respect to said stator and having a null position; and
switching means disposed to be actuated by said sensing means for causing said rotor to lock in position relative to said stator when said sensing means is at the null position and for causing self-sustained successive energization of said stator windings and consequent continuous movement of said rotor past said stator when said sensing means is displaced from the null position.

7. A dynamo electric machine as claimed in claim 6 wherein:
said sensing means comprises a cam member connected to said rotor for unitary movement; and,
said switching means comprises a plurality of switches which are activated by said cam member moving with said rotor.

8. A dynamo electric machine as claimed in claim 7 wherein:
said rotor is laminated and carries a plurality of axially parallel short circuited conducting loops; and,
a small uniform air gap is maintained between said rotor and said stator.

* * * * *